(12) United States Patent
Kim et al.

(10) Patent No.: US 8,427,597 B2
(45) Date of Patent: Apr. 23, 2013

(54) MODULE FOR LIQUID CRYSTAL DISPLAY DEVICE HAVING CUSHION MEMBERS TO PREVENT MECHANICAL DEFORMATION AND LIGHT LEAKAGE

(75) Inventors: Kyoung Sub Kim, Gumi-si (KR); Seok Hwan Oh, Gimcheon-si (KR)

(73) Assignee: LG Display Co., Ltd., Seoul (KR)

( * ) Notice: Subject to any disclaimer, the term of this patent is extended or adjusted under 35 U.S.C. 154(b) by 752 days.

(21) Appl. No.: 11/138,357

(22) Filed: May 27, 2005

(65) Prior Publication Data

US 2005/0264712 A1 Dec. 1, 2005

(30) Foreign Application Priority Data

May 31, 2004 (KR) ............ 10-2004-0038852

(51) Int. Cl.
*G02F 1/1333* (2006.01)
(52) U.S. Cl.
USPC .......... 349/58; 349/59; 349/60; 361/681
(58) Field of Classification Search .......... 349/58–60; 361/681; 345/87
See application file for complete search history.

(56) References Cited

U.S. PATENT DOCUMENTS

| | | | | |
|---|---|---|---|---|
| 5,150,231 | A * | 9/1992 | Iwamoto et al. | 349/60 |
| 6,147,724 | A * | 11/2000 | Yoshii et al. | 349/62 |
| 6,151,207 | A * | 11/2000 | Kim | 361/681 |
| 6,333,459 | B1 * | 12/2001 | Sato et al. | 174/377 |
| 6,525,790 | B1 * | 2/2003 | Kan-o | 349/58 |
| 6,812,976 | B2 * | 11/2004 | Satonaka | 349/58 |
| 6,977,694 | B2 * | 12/2005 | Natsuyama | 349/60 |
| 2001/0043293 | A1 * | 11/2001 | Inoue | 349/58 |
| 2002/0149713 | A1 * | 10/2002 | Ishida et al. | 349/58 |
| 2003/0011547 | A1 * | 1/2003 | Igarashi et al. | 345/87 |
| 2004/0189886 | A1 * | 9/2004 | Chang et al. | 349/58 |
| 2005/0259191 | A1 * | 11/2005 | Park et al. | 349/58 |
| 2005/0270728 | A1 * | 12/2005 | Chen et al. | 361/681 |
| 2006/0005922 | A1 * | 1/2006 | Watanabe | 156/291 |
| 2006/0232564 | A1 * | 10/2006 | Nishimura et al. | 345/173 |

FOREIGN PATENT DOCUMENTS

| | | |
|---|---|---|
| JP | 56-47565 | 4/1981 |
| JP | 3-283232 | 12/1991 |
| JP | 4-28686 | 1/1992 |
| JP | 08-179288 | 1/1996 |
| JP | 08-179283 | 7/1996 |
| JP | 08-211402 | 8/1996 |
| JP | 11-242447 | 9/1999 |
| JP | 11-338372 | 12/1999 |
| JP | 2001-013484 | 1/2001 |
| JP | 2001-083887 | 3/2001 |
| JP | 2001-142054 | 5/2001 |
| JP | 2002-328623 | 11/2002 |
| JP | 2003-084263 | 3/2003 |
| KR | 1999-008719 | 2/1999 |
| KR | 10-2003-0058548 A | 7/2003 |

* cited by examiner

*Primary Examiner* — Huyen Ngo
(74) *Attorney, Agent, or Firm* — McKenna, Long & Aldridge, LLP.

(57) ABSTRACT

Disclosed is an LCD module that has a cushion member, or a plurality of buffer structures, which prevents mechanical deformation of the LCD panel, and the light leakage that results from the mechanical deformation. The plurality of cushion members are bonded to only a single inside edge of the panel guide and evenly distanced such that they provide a cushion to the LCD panel to reduce a concentrated weight generated by pressing due to the weight of the LCD panel. The cushion member, or the plurality of buffer structures, prevents mechanical deformation by distributing the weight of the LCD panel. The LCD module comprises an LCD panel, a backlight assembly, and a guide panel having the cushion member or buffer structures.

5 Claims, 6 Drawing Sheets

MODULE FOR LIQUID CRYSTAL DISPLAY DEVICE HAVING CUSHION MEMBERS TO PREVENT MECHANICAL DEFORMATION AND LIGHT LEAKAGE

This application claims the benefit of Korean Patent Application No. P2004-38852 filed in Korea on May 31, 2004, which is hereby incorporated by reference for all purposes as if fully set forth herein.

BACKGROUND OF THE INVENTION

1. Field of the Invention

The present invention relates to a module for a liquid crystal display device (LCD). More particularly, the present invention relates to an LCD module capable of preventing light leakage resulting from mechanical deformation of the LC panel by more evenly distributing the weight of the LC panel.

2. Discussion of the Related Art

LCD devices have excellent visibility, low power consumption, and generate less heat compared with a cathode ray tube (CRT). Accordingly, LCD technology are considered to be one of the next-generation display device technologies for televisions and computer monitors. The advantages of LCD technology also make it well suited for applications such as cellular phones and appliances.

An LCD displays an image by selectively attenuating transmitted light in each pixel in the display. An LCD has an LCD panel, which includes a liquid crystal (LC) material that is disposed between two thin glass plates. The LC material is in an intermediate phase between solid and liquid. The two glass plates, or substrates, have electrodes formed on one or more of their inner surfaces, and one of the substrates has a separate electrode for each pixel. By controlling an electric field between the two substrates, the molecular alignment of the LC material can be controlled to selectively control the transmission of light at each pixel.

Since the LCD panel does not actively emit light, the LCD requires a light source such as a lamp to allow a displayed content to be visually recognized. Generally, an LCD module used for a display device has a backlight assembly as a light source, which is adjacent to the rear of the LCD panel.

FIG. 1 is a sectional view of an LCD module according to the related art. As illustrated in FIG. 1, the module 100 of an LCD includes an LCD panel 110 disposed on the front side of the module 100; a backlight assembly 130 installed on the backside of the LCD panel 110; a panel guide 120 for seating the LCD panel 110; a front cover 121 for supporting the LCD panel 110 at a peripheral area of the LCD panel front surface; and a rear cover 123 having a rectangular shape, which encloses the lower surface of the backlight assembly 130 and couples with the front cover 121.

The backlight assembly 130 includes a plurality of lamps 131 arranged in parallel to each other at a constant interval along the rear cover 123; a reflector 134 disposed at the rear of the lamps 131, for reflecting light emitted from the lamp 131 toward the front side of the module; and optical sheets 135 and 136 disposed forward the lamp 131, for enhancing the efficiency of light emission.

The panel guide 120 seats, fixes, and supports the LCD panel 110 and has a receiving space to install the lamps 131 of the backlight assembly 130 along one of its edges. Wires (not shown) for supplying power from the outside are respectively connected to both ends of the lamps 131. The backlight assembly 130, including the reflector 134 and the optical sheets 135 and 136 is inserted and fixed into position according to the panel guide 120, and the LCD panel 110 for displaying information using light transferred from the backlight assembly 130 is disposed in front of the optical sheets.

The rear cover 123 has a coupling groove formed in a predetermined interval on its back side that corresponds to the panel guide 120. The rear cover 123 has an L-shape around its periphery, substantially enclosing the rear and side edges of the backlight assembly 130. The rear cover 123 is generally made of aluminum.

The front cover 121 has an L-shape around its periphery and is coupled with the rear cover 123 to prevent the LCD panel 110 from being detached from the panel guide 120.

FIG. 2 illustrates an LCD panel 110 seated on the panel guide 120 illustrated in FIG. 1. Referring to FIG. 2, the four edge sides of the LCD panel 110 are seated on the panel guide 120. The panel guide 120 has one side on which the LCD panel 110 stands, referred to as the bottom edge, which includes ribs spaced at a predetermined interval. Accordingly, the LCD panel 110 is supported by the ribs of the panel guide 120.

If the LCD panel 110 is small, the weight of the LCD panel, and thus the pressure on the bottom edge of the guide panel 120, can be ignored. However, larger LCD panels exert pressure on the bottom edge of the guide panel 120 that can mechanically deform the LCD panel. Increasing the width of the rib on the bottom edge of the panel guide 120 fails to distribute the pressure exerted by the weight of the LCD panel.

Accordingly, it is difficult to secure uniform rigidity over an entire width of the LCD panel, given the plastic characteristics of the ribs of the guide panel 120. This results in concentrated pressure applied to the portions of the LCD panel that correspond to the ribs of the panel guide, causing bending. Bending of the LCD panel results in light leakage due to local optical interferences in the panel. The arrangement of the LC molecules in the LCD panel changes due to the concentrated pressure, producing light leakage that results in lines of increased brightness.

SUMMARY OF THE INVENTION

Accordingly, the present invention is directed to a module for a liquid crystal display device that substantially obviates one or more of the aforementioned problems due to limitations and disadvantages of the related art. In general, the present invention achieves this by providing a cushion member, or a plurality of buffer structures, that distributes the weight of the LCD panel and prevents mechanical deformations that cause light leakage.

An advantage of the present invention is that it more effectively prevents light leakage of an LCD panel.

Another advantage of the present invention is that it more effectively prevents mechanical deformation of the LCD panel.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with an LCD module that comprises an LCD panel disposed on a front side of the module; a backlight assembly disposed on a rear side of the LCD panel; a panel guide seating the LCD panel; and a cushion member attached on a bottom edge of the panel guide, the cushion member in contact with the LCD panel.

In another aspect of the present invention, the aforementioned and other advantages are achieved by an LCD module that comprises an LCD panel disposed on a front side of the module; a backlight assembly disposed on a rear side of the LCD panel; a panel guide having a frame shape; and a plurality of buffer structures disposed on a bottom edge of the panel guide and in contact with the LCD panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the preferred embodiments of the present invention, examples of which are illustrated in the accompanying drawings.

Figure 1:
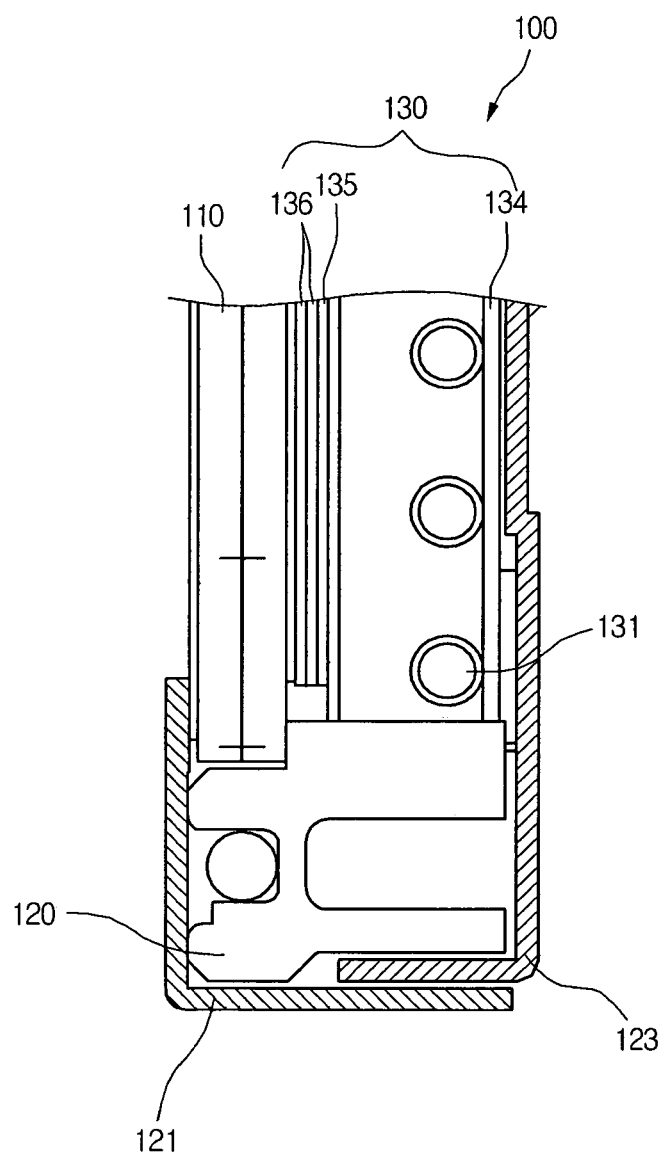
FIG. 1 is a sectional view of a module of an LCD according to a related art.
Figure 2:
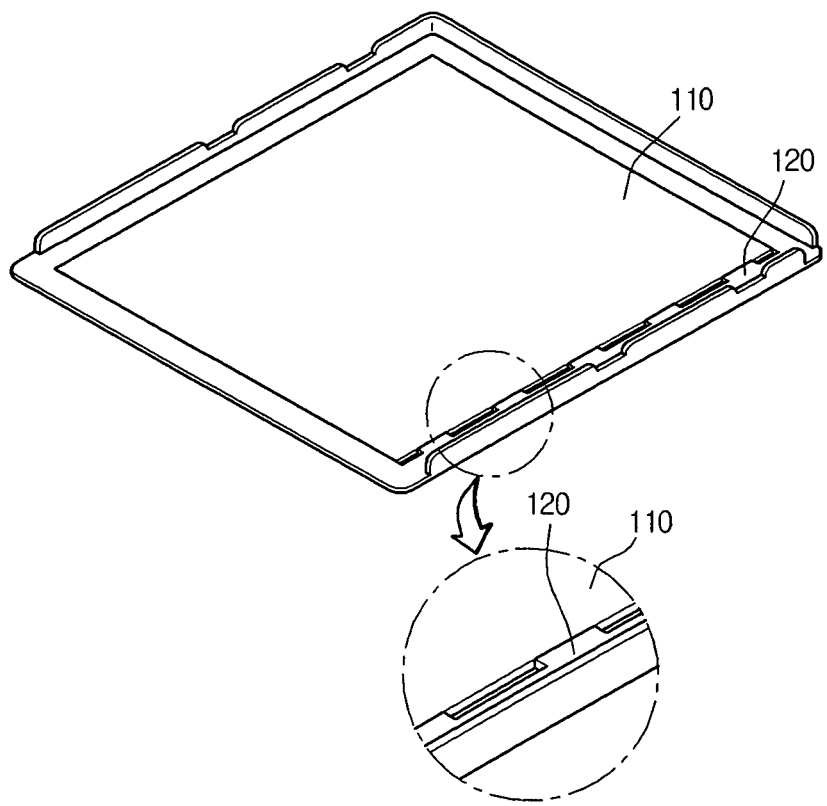
FIG. 2 illustrates an LCD panel seated on the panel guide illustrated in FIG. 1.
Figure 3:
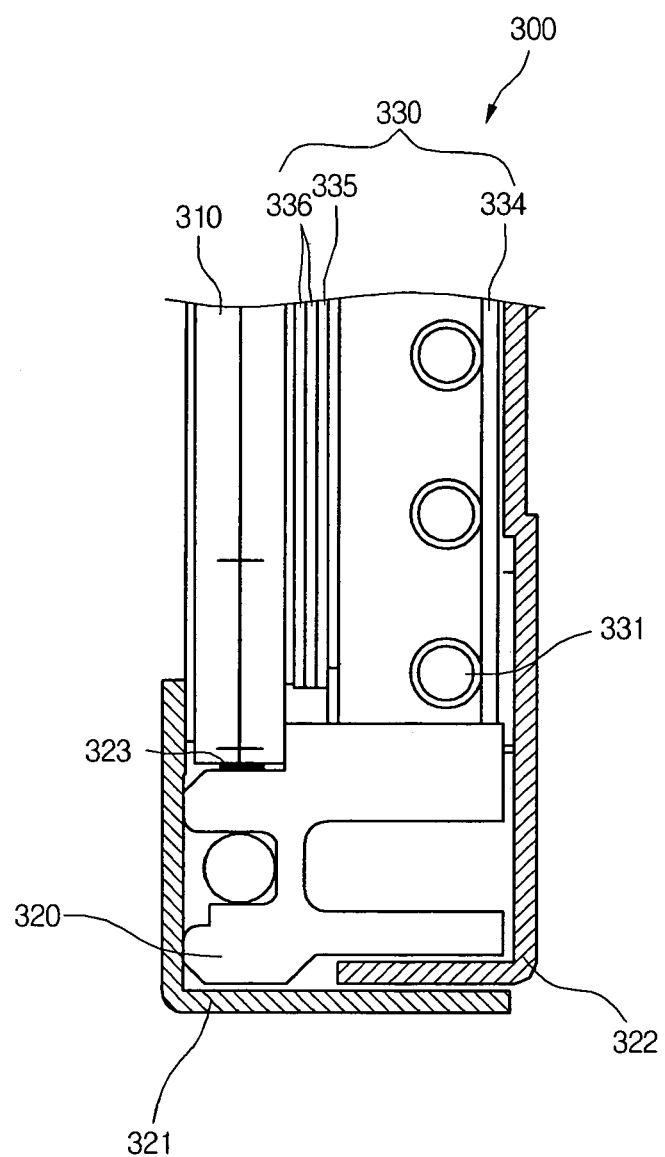
FIG. 3 is a schematic sectional view of an exemplary LCD module according to a first embodiment of the present invention.

FIG. 3 is a schematic sectional view of an exemplary module of an LCD according to a first embodiment of the present invention. Referring to FIG. 3, the module 300 of an LCD includes an LCD panel 310 disposed on a front side of the module; a backlight assembly 330 installed on a backside of the LCD panel 310; a panel guide 320 having a frame shape; a cushion member 323 attached to the bottom edge of the panel guide 320; a front cover 321; and a rear cover 322 having the panel guide 320 therein and coupled with the front cover 321.

The backlight 330 is a light source for the LCD panel 310, which displays an image. The panel guide 320 provides for precise positioning of the backlight assembly 330 and seats the four edge sides of the LCD panel 310. The front cover 321 supports a peripheral area of the front surface of the LCD panel 310.

The cushion member 323 is provided on the bottom edge of the panel guide 320 that contacts the LCD panel 310 and on which the weight of the LCD panel 310 is applied. Cushion member 323 supports the weight of the LCD panel 310 such that mechanical deformation, and thus light leakage, is mitigated. The cushion member 323 may be made of rubber or poron, may be processed in a predetermined shape, and may be bonded to the bottom edge of the panel guide 320 on which the weight of the LCD panel 310 is applied.

The LCD panel 310 includes an upper and lower substrate, each having a polarization plate, and LC material disposed between the substrates. The LCD panel 310 has electrodes that define a plurality of pixels arranged in the form of matrix. Each of the pixels are driven by a thin film transistor (TFT) integrated onto the LCD panel. A tape carrier package (not shown), which includes a drive integrated circuit, is mounted between a signal line pad formed on the edge of the LCD panel 310 and a printed circuit board (not shown) installed on the upper portion of a LCD module 300. The backlight assembly 330 is generally an edge-type or a direct-type. In the embodiment of the present invention, description will be made for the direct-type backlight assembly.

The backlight assembly 330 includes a plurality of lamps 331 arranged in parallel to each other at a substantially constant interval near the rear cover 322; a reflector 334 located at the rear of the plurality of lamps 331; optical sheets 335 and 336 disposed forward of the lamp 331; and a light guide plate (not shown).

The optical sheets 335 and 336 may each include a diffusion sheet disposed forward of the lamps 331 for uniformly diffusing light emitted from the lamps 331, and a condensing sheet disposed on the diffusion sheet, for condensing the light diffused by the diffusion sheet to transfer the diffused light to the LCD panel 310. The lamps 331 of the backlight assembly 330 are installed along the edge on one side within the panel guide 320. Wires (not shown) for supplying power from the outside are respectively connected to both ends of each of the lamps 331.

Figure 4:
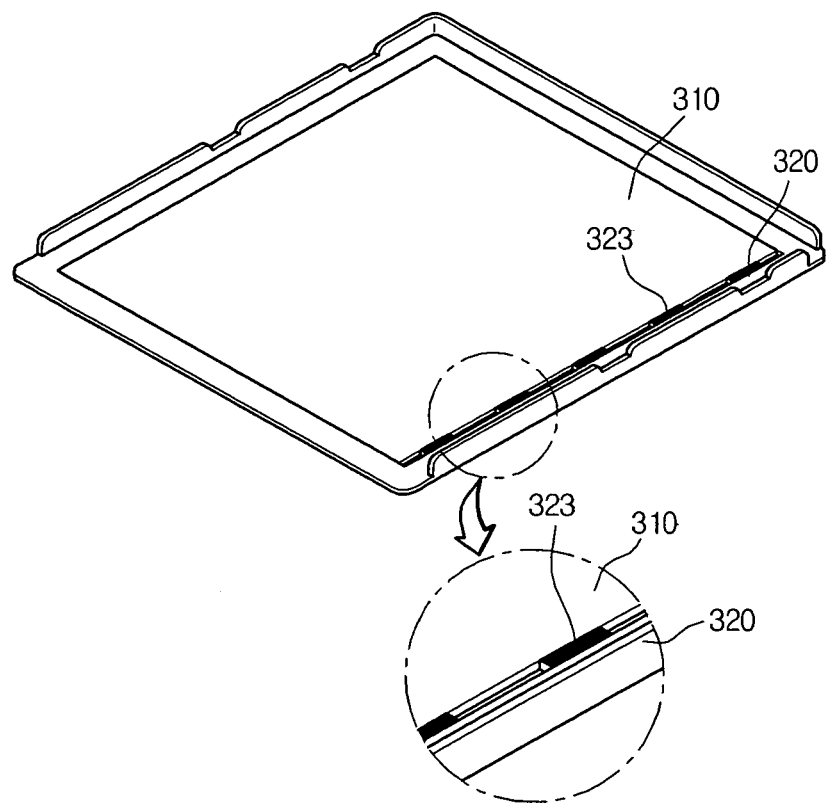
FIG. 4 is a perspective view of an LCD panel seated on a panel guide on which a cushion member illustrated in FIG. 3 is attached.

FIG. 4 is a perspective view of an LCD panel 310 seated on a panel guide 320 on which a cushion member 323 is attached. The panel guide 320 may be made of a resin material such as polycarbonate. Referring to FIG. 4, the panel guide 320 has a frame shape so that the four sides of the LCD panel 310 may be seated thereon. When the LCD panel 310 stands on one side of the panel guide 320, the cushion member 323 reduces concentrated weight generated by pressing due to the weight of the LCD panel 310. In particular, as illustrated in FIG. 4, each of the cushion members 323 has a rectangular cube shape. The cushion members 323 are substantially evenly distanced along the panel guide 320 such that the entire rectangular surfaces of the cushion members 323 that contact the LCD panel 310 provide a cushion to reduce a concentrated weight generated by the pressure caused by the weight of the LCD panel 310. Accordingly, localized stress is not applied on the LC contained in the LCD panel, so that the light leakage does not occur.

The front cover 321 has a bent predetermined region and is coupled with the rear cover 322 to prevent the LCD panel 310 from being detached from the panel guide 320.

The rear cover 322 may be made of metal and may have coupling grooves formed at a predetermined interval at positions that correspond to the panel guide 320. Also, the rear cover 322 may have a bent shape for enclosing one side and the backside of the backlight assembly 330.

Figure 5:
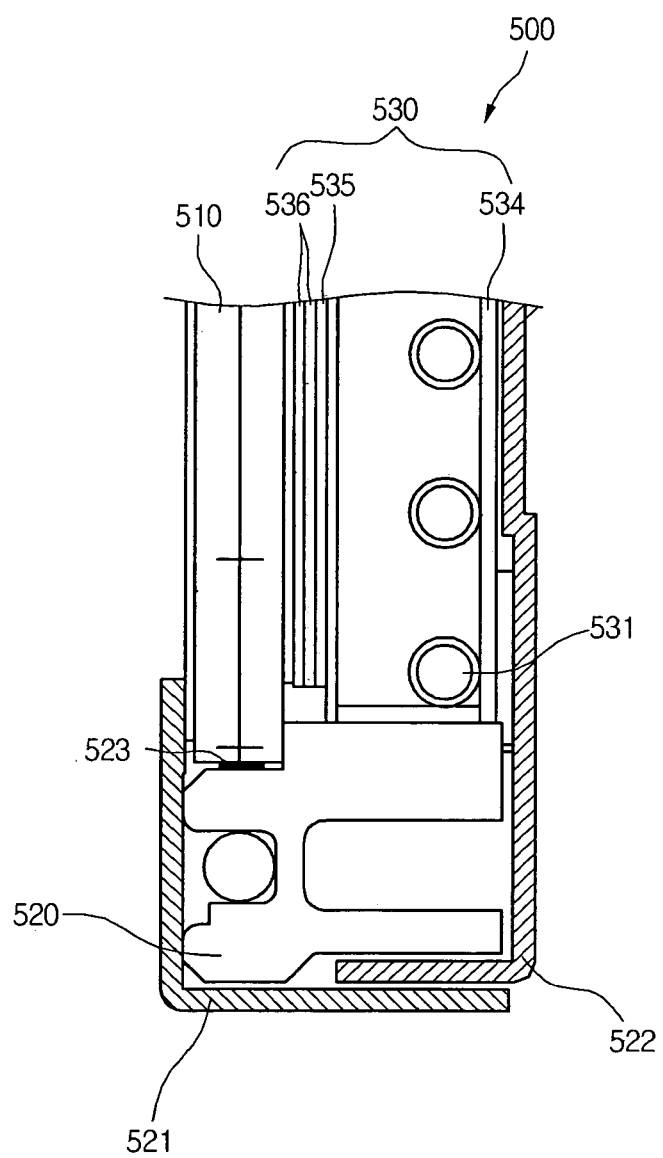
FIG. 5 is a schematic sectional view of an exemplary LCD module according to a second embodiment of the present invention.

FIG. 5 illustrates an exemplary module of an LCD module 500 according to a second embodiment of the present invention. Referring to FIG. 5, an LCD module 500 includes an LCD panel 510 disposed on a front side of the module; a backlight assembly 530 installed on a rear side of the LCD panel 510; a panel guide 520 having a frame shape; a buffer structure 523 on a bottom edge of the panel guide 520 on which the LCD panel 510 is seated; a front cover 512 for supporting the LCD panel 510 at a peripheral area on the front surface of the LCD panel 510; and a rear cover 522 for enclosing a rear side of the backlight assembly 530.

Referring to FIG. 5, the buffer structure 523 is integrally formed on one side of the panel guide 520 that contacts the LCD panel 510 and on which the weight of the LCD panel is applied. The buffer structure 523 substantially evenly distributes the weight of the LCD panel to mitigate light leakage resulting from change in the arrangement of the LC molecules due to mechanical deformations of the LCD panel 510.

Figure 6:
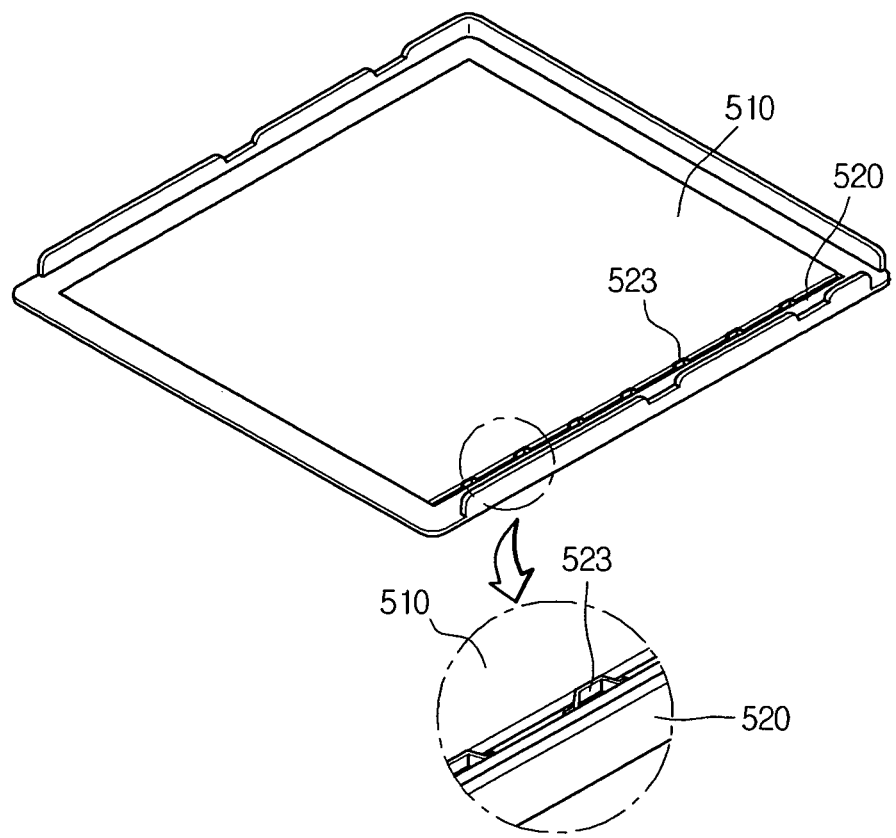
FIG. 6 is a perspective view of an LCD panel seated on a panel guide having a buffer structure illustrated in FIG. 5.
Figure 7:
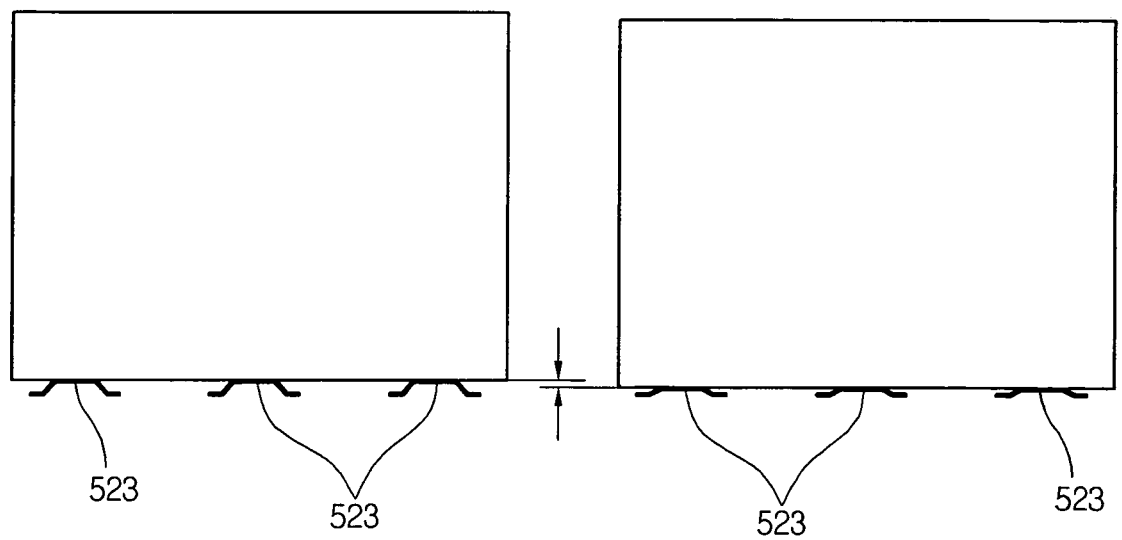
FIG. 7 illustrates an LCD panel seated by a buffer structure illustrated in FIG. 5.

FIGS. 6 and 7 present different views of an LCD panel 510 seated on a panel guide 520 having a buffer structure 523 illustrated in FIG. 5. Referring to FIGS. 6 and 7, a plurality of buffer structures 523 is formed on one side of the panel guide 520, which are pressed by the weight of the LCD panel 510 when the LCD panel 510 stands upright. The buffer structure 523 serves as a cushion to reduce the concentrated of pressure on the LCD panel. The buffer structure 523 is formed on one side of the panel guide 520 that contacts the LCD panel 510 and on which the weight of the LCD panel 510 is applied. The buffer structure 523 may be integrally formed with the panel guide 520.

The buffer structure 523 may include a plate spring. Referring to FIG. 7, when the weight of the LCD panel 510 is applied, the plurality of buffer structures 523 contacting the LCD panel 510 are simultaneously pressed so that each of the buffer structures 523 respond independently to the pressure individually exerted on them. Each of the buffer structures 523 independently bears the weight of the LCD panel 510. Accordingly, pressure is evenly exerted by the LCD panel 510 and is not concentrated in one location. This prevents mechanical deformation of the LCD panel 510 and prevents localized change in arrangement of LC molecules that results.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:
1. An LCD module comprising:
an LCD panel disposed on a front side of the module;
a backlight assembly disposed on a rear side of the LCD panel;
a panel guide seating the LCD panel; and
a plurality of cushion members bonded to only a single inside edge of the panel guide, the cushion members in contact with one outside edge of the LCD panel,
wherein the weight of the LCD panel is applied to the single inside edge of the panel guide when the LCD panel stands on the panel guide,
wherein each of the cushion members has a rectangular cube shape,
wherein the cushion members are substantially evenly distanced along the panel guide such that the entire rectangular surfaces of the cushion members that contact the LCD panel provide a cushion to reduce a concentrated weight generated by the pressure caused by the weight of the LCD panel,
wherein the inside edge of the panel guide includes a first surface and a second surface in a stepped shape,
wherein the cushion members are disposed on the first surface of the inside edge of the panel guide,
wherein the cushion members include poron.

2. The module according to claim 1, wherein the cushion members is bonded to the inside edge of the panel guide.

3. The module according to claim 1, wherein the backlight assembly comprises:
a plurality of lamps arranged in parallel to each other;
a reflector disposed at the rear of the plurality of lamps; and
a plurality of optical sheets disposed forward of the plurality of lamps.

4. The module according to claim 1, wherein the panel guide comprises a resin material.

5. The module according to claim 1, wherein the panel guide comprises polycarbonate.

* * * * *